United States Patent
Yang et al.

(10) Patent No.: US 11,776,011 B2
(45) Date of Patent: Oct. 3, 2023

(54) METHODS AND APPARATUS FOR IMPROVING THE SELECTION OF ADVERTISING

(71) Applicant: Walmart Apollo, LLC, Bentonville, AR (US)

(72) Inventors: Peng Yang, San Jose, CA (US); Dong Xu, San Jose, CA (US); Yue Guo, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 221 days.

(21) Appl. No.: 17/195,534

(22) Filed: Mar. 8, 2021

(65) Prior Publication Data
US 2022/0284476 A1 Sep. 8, 2022

(51) Int. Cl.
G06Q 30/0251 (2023.01)
G06Q 30/0242 (2023.01)
G06Q 30/0241 (2023.01)

(52) U.S. Cl.
CPC ..... *G06Q 30/0257* (2013.01); *G06Q 30/0246* (2013.01); *G06Q 30/0276* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 2008/0140591 A1* | 6/2008 | Agarwal | G06F 16/951 707/E17.108 |
| 2015/0095271 A1* | 4/2015 | Ioannidis | G06N 7/01 706/12 |
| 2018/0012248 A1* | 1/2018 | Connelly | G06Q 30/0241 |
| 2019/0080348 A1* | 3/2019 | Shah | G06Q 30/0277 |

OTHER PUBLICATIONS

E. Janel Roland Chumley, "Bandits for Recommender System Optimization", retrieved from https://towardsdatascience.com/bandits-for-recommender-system-optimization-1d702662346e, available on Mar. 4, 2018 (Year: 2018).*
Optimizely Inc., "Multi-Armed Bandit", found at: https://www.optimizely.com/optimization-glossary/multi-armed-bandit/ printed Jan. 13, 2021, 3 pages.
Yang, Hongxia, et al., "Dynamic Contextual Multi Arm Bandits in Display Advertisement", IEEE 16th International Conference on Data Mining, DOI 10.1109/ICDM.2016.22, 2016, pp. 1305-1310.

* cited by examiner

*Primary Examiner* — Sam Refai
(74) *Attorney, Agent, or Firm* — Morgan, Lewis & Bockius LLP; Manita Rawat

(57) ABSTRACT

The disclosed subject matter relates to a system and method for selecting/recommending ads based on a contextual bandit approach. The disclosed approach leverages various embedding vectors of item, search, page taxonomy trained based on traffic data via advanced deep learning models, and uses model signals (e.g. historical CTR, item price, rating, quality) from other ad placements. The learning mechanism on top of the current methodology to automatic chooses the best feature sets and adjust model performance over time.

(Continued)

The contextual bandit model performs better with respect to CTR than the Thompson Sampling model, and achieves lower regret and faster convergence over time.

20 Claims, 9 Drawing Sheets

METHODS AND APPARATUS FOR IMPROVING THE SELECTION OF ADVERTISING

TECHNICAL FIELD

The disclosed subject matter relates generally to selection of products/brands/services to market during an online interaction. Specifically, an automated shopping assistant that selects marketing ads to a consumer in response to a query.

BACKGROUND

In recent years, with the development of cognitive intelligence technology, the success rate of speech recognition has been greatly improved, and applications based on speech recognition as well as natural language processing have also been comprehensively promoted. In addition to basic applications such as voice input, voice-based and text-based human-computer interaction applications such as voice and online assistants (i.e. automated assistants) have gradually become the standard configuration of intelligent systems. Such assistants can allow users to interact with devices or systems using natural language in spoken and/or text forms. For example, a user can provide a speech input containing a user request to an automated assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

In the prior art, the voice assistant is usually used in conjunction with the knowledge base. The front end first recognizes the user's voice input, converts the voice information into text information, and then queries in the knowledge base, and then matches the query with the voice content.

Intelligent automated assistants can provide an intuitive interface between users and electronic devices. Furthermore a digital assistant can be utilized to assist with searching for consumer products and/or there attributes.

These interactions with the user/customer/consumer present an opportunity for marketing other products/brands, especially products or brands related to the searched product or product types. Moreover, these interactions may be advantageously used to generate advertisement revenue. Thus the selection of the products/brands or services to be marketed during these interactions may be advantageously optimized.

One example of exploiting the marketing opportunities presented by an automated assistant is search brand amplifier (SBA) ad placement service, in which ads appear on top of the page immediately after a consumer search query. Current SBA methods to select ads, for example use a Thompson Sampling approach, unfortunately this approach, takes long time to learn customer online shopping behaviors and is slow to adapt to customer preference shift under non-stationary environment. Thus there is a need in the art to developed a robust and responsive method for SBA ads recommendation, which leverages 1) various embedding vectors of items/products/services, search queries, page taxonomy trained based on traffic data via advanced deep learning models, as well as 2) strong model signals (e.g. historical CTR. item price, rating, quality) from other ad placements and automatically choose the best feature sets and adjust model performance over time. (CTR stands for click-through rate and it measures the percentage of clicks an ad gets based on its total number of impressions).

SUMMARY

The embodiments described herein are directed to a system and method for selecting ads in support of a SBA campaign and retrieving information from a knowledge base in response to a user's natural language question, specifically with an automated shopping assistant. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system including a communication system; a database containing a plurality of marketing ads; and, a computing device operably connected to the database and the communication system to select a plurality of ads is presented. The computing device being configured to assign a first parameter set to the plurality of marketing ads; receive an input query from a user/customer and determine a feature(s) of the query. The computing device further filters the marketing ads from the database based on the feature(s) to create a set of candidate marketing ads that would be eligible for consideration to be placed before the user; determines a context feature set parameter for the candidate marketing ads and selects a presentation set of marketing ads based upon the context feature parameter of each of the candidate marketing ad. The computing device transmits the selected presentation set of marketing ads to the user and a receives a reward metric; based upon a plurality of reward metric, the first parameter set is optimized and updated.

In some embodiments, a method for improving the selection of marketing ads is presented. The method includes, assigning a first parameter set for each of the plurality of marketing ads; receiving an input query and determining a feature of the query. The method filters marketing ads from the database based on the feature to create a set of candidate marketing ads, for each of the ads the method includes determining a context feature set parameter and selecting a second set of marketing ads based upon the context feature parameter. The method further include transmitting the selected set of marketing ads to the user; receiving a reward metric; and updating and optimizing the first parameter set for each of the marketing ads as a function of the reward metric. In the method the context feature set parameter is a function of at least the first parameter set.

In yet other embodiments, a non-transitory computer readable medium having instructions stored thereon is provided. The instructions, when executed by at least one processor, cause a device to perform operations. The operations include assigning a first parameter set for each of the plurality of marketing ads; receiving an input query and determining a feature of the query. The method filters marketing ads from the database based on the feature to create a set of candidate marketing ads, the operations further include determining a context feature set parameter and selecting a second set of marketing ads based upon the context feature parameter. The operations further include transmitting the selected set of marketing ads to the user;

receiving a reward metric; and updating and optimizing the first parameter set for each of the marketing ads as a function of the reward metric.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

Figure 1:
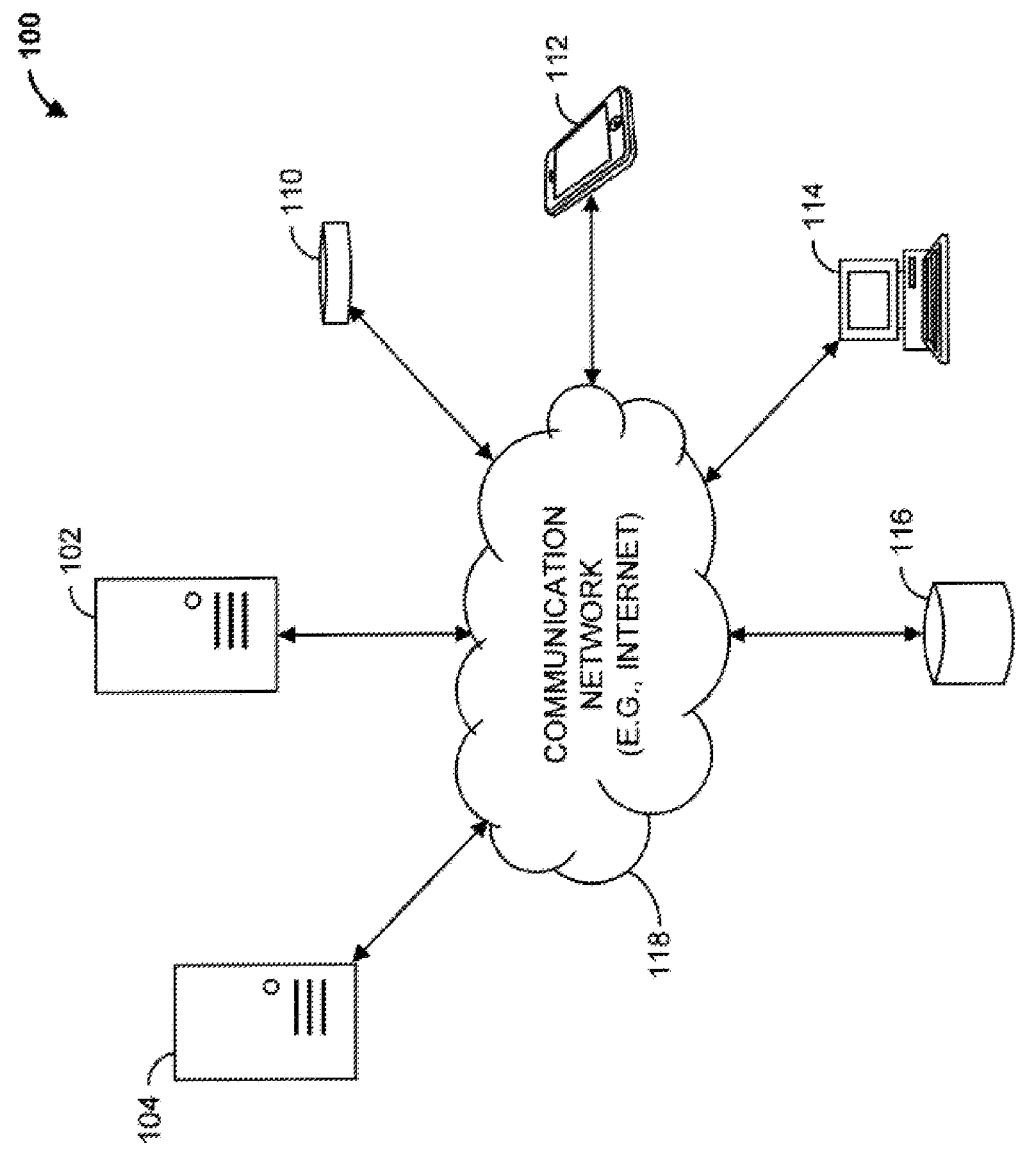
FIG. 1 is a block diagram of communication network used to retrieve relevant information contained in the knowledge base in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

DETAILED DESCRIPTION

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes an marketing ad selection computing device 102 (e.g., a server, such as an application server), a web server 104, database 116, and multiple customer computing devices 110, 112, 114 operatively coupled over network 118.

A marketing ad selection computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the marketing ad selection computing device 102 may be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, marketing ad selection computing device 102, and web server 104 are operated by a retailer, and multiple customer computing devices 112, 114 are operated by customers of the retailer.

Although FIG. 1 illustrates three customer computing devices 110, 112, 114, advertisement system 100 can include any number of customer computing devices 110, 112, 114. Similarly, the communication system 100 can include any number of workstation(s) (not shown), marketing ad selection computing devices 102, web servers 104, and databases 116 and 117.

The marketing ad selection computing device 102 is operable to communicate with database 116 over communication network 118. For example, the marketing ad selection computing device 102 can store data to, and read data from, database 116. Database(s) 116 may be remote storage devices, such as a cloud-based server, a disk (e.g., a hard disk), a memory device on another application server, a networked computer, or any other suitable remote storage. Although shown remote to the marketing ad selection computing device 102, in some examples, database 116 may be a local storage device, such as a hard drive, a non-volatile memory, or a USB stick. The marketing ad selection computing device 102 may store data from workstations or the web server 104 in database 116. In some examples, storage devices store instructions that, when executed by the marketing ad selection computing device 102, allow the marketing ad selection computing device 102 to determine one or more results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
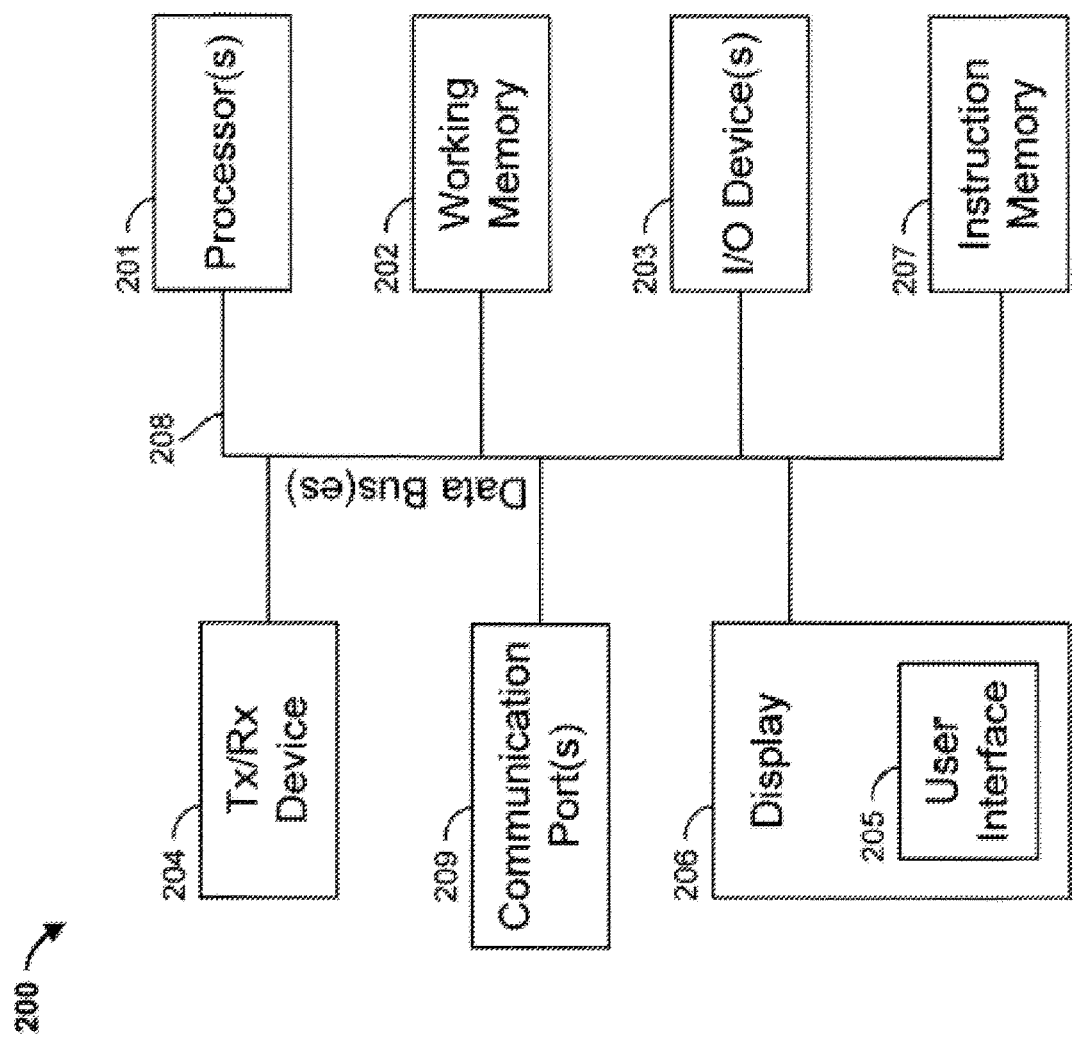
FIG. 2 is a block diagram of the computing device of the communication system of FIG. 1 in accordance with some embodiments.

FIG. 2 illustrates the marketing ad selection computing device 102 of FIG. 1. The marketing ad selection computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of the marketing ad selection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with marketing ad selection computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 marketing ad selection computing device 102 will be operating in. Processor(s) 201 is operable to receive data from, or send data to, a network, such as communication network 118 of FIG. 1, via transceiver 204.

Figure 3:
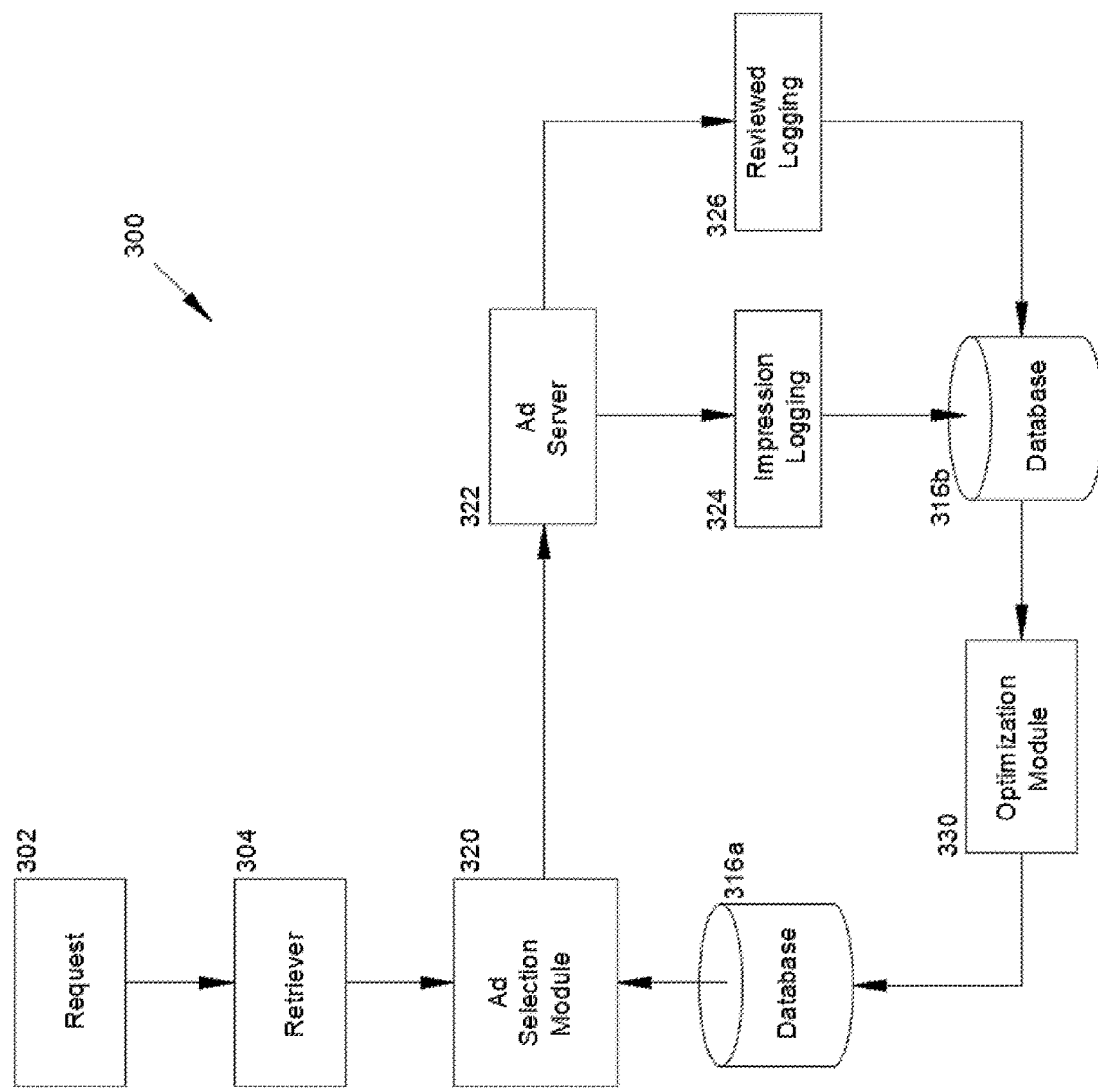
FIG. 3 is a block diagram for marketing according to some embodiments of the disclosed subject matter.
Figure 4:
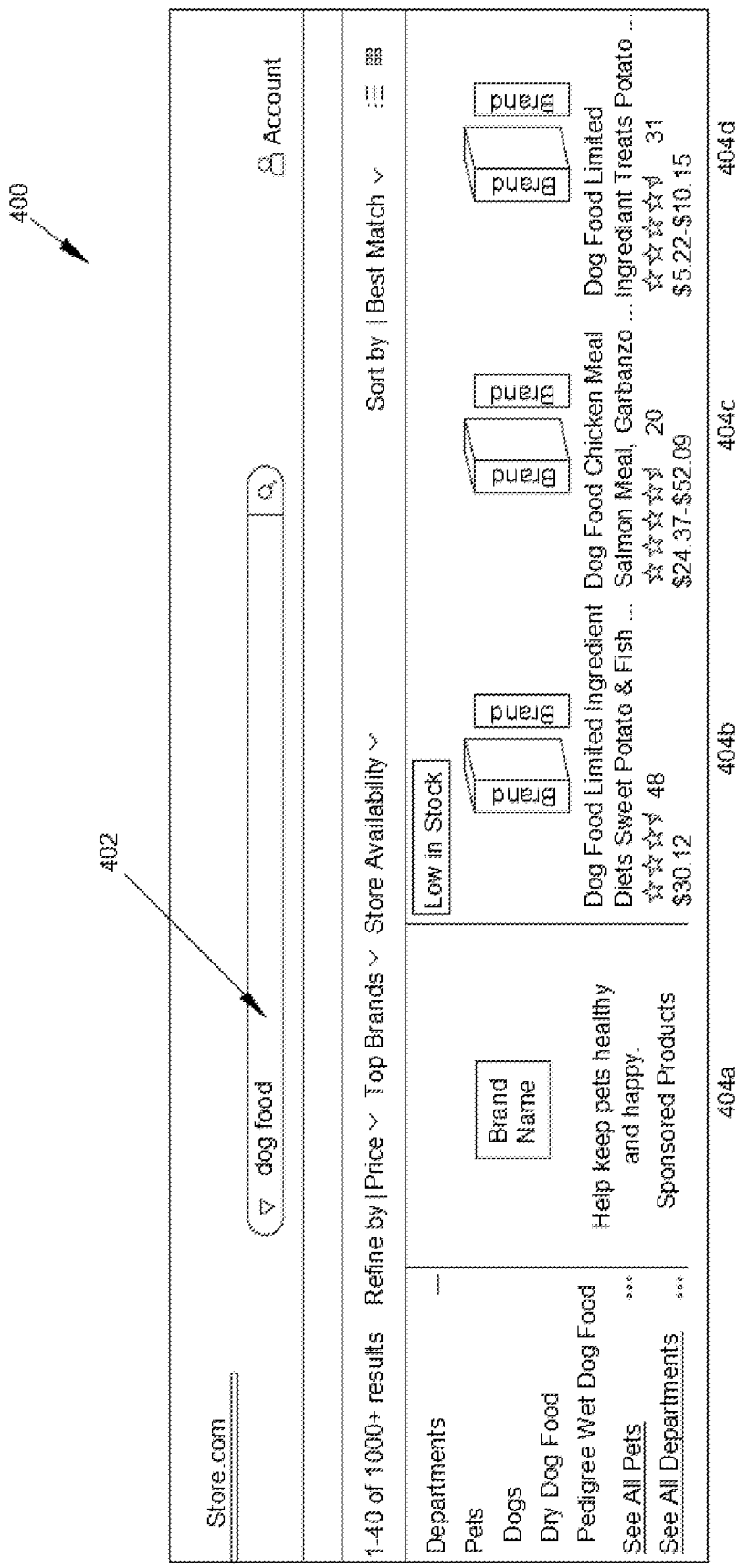
FIG. 4 is a representation of ad presentation to the consumer.

FIG. 3 illustrates at a high level an automated assistant system 300 including an ad selection module 320 utilizing a contextual bandit method to advantageously select the ads to be provided to the consumer based on maximizing results (rewards). A request 302 is generated in response to an user query, the request may include categories, keywords, classifications, platform etc. determined from the query intent. A retriever 304 identifies/filters the ads based upon the categories, keywords, classification, platforms of the requests to create a set of candidate ads which are communicated to the ad selector module 320, the candidate ads may be directed to products, services or may include brands to which several products or services may be associated with. The ad selector module 320 accessing the selected feature set associated with the ads via database 316a, as well as from the request, uses a contextual bandit approach to selecting the highest ranked ads based on the feature set parameter determined for each of the candidate ads which is based on a linear or logistic payoff function. The ad features may include taxonomy (e.g. taxonomy match score represent how close the ad taxonomy is compared to the query taxonomy), title (e.g. title similarity, which represents how close the ad name is compared to the query), taxonomy vector (e.g. distance between the taxonomy vector of the ad compared to the query vector); title vector, product vector; classification, platform, product ratings, product reviews, ad rating, time of day, time of week, price sensitivity etc. as well as the sponsor bids for each ad. The number of ads may be selected by the retailer understanding the diminishing consumer attention as the number of ads increase as well as the complexities in optimizing the ad selection. The selected ads are transmitted to the user with the query result by the ad server 322. FIG. 4 illustrates a representation on how the ads may be presented to the user with the query results. An exemplary display 400 of an automated shopping assistant is shown in FIG. 4. The user input query 402 (dog food) results in several products and brands 404a-d being displayed in a prominent position on the page as part of a sponsored SBA campaign. Typically, a list of specific products meeting the query intent would also be shown on the page.

Returning to FIG. 3, the impressions/views (number of times presented) of the ads are logged in the impression logging module 324 as well as subsequent rewards received though the users interactions with the selected ads in reward logging module 326. The rewards logged may include view duration, clicks, add to cart and purchases, and each may have different reward values. For example a purchase may have a higher reward than a click. The logs 324 and 326 store the logged data in data base 316b. Databases 316a and 316b, while shown in FIG. 3 separately are equally envisioned as being a unitary or distributed database. The optimization module 330 using the logged data updates the feature set parameter for the ads (on a predetermined schedule based on time or quantity) to optimize expected ad revenue, CTR, etc., the feature set and respective significance will change for different product categories/types, customer preference shift, etc. The updated feature set parameter is used by the ad selector module 320 in the contextual bandit approach for selecting ads for subsequent user queries.

Figure 5:
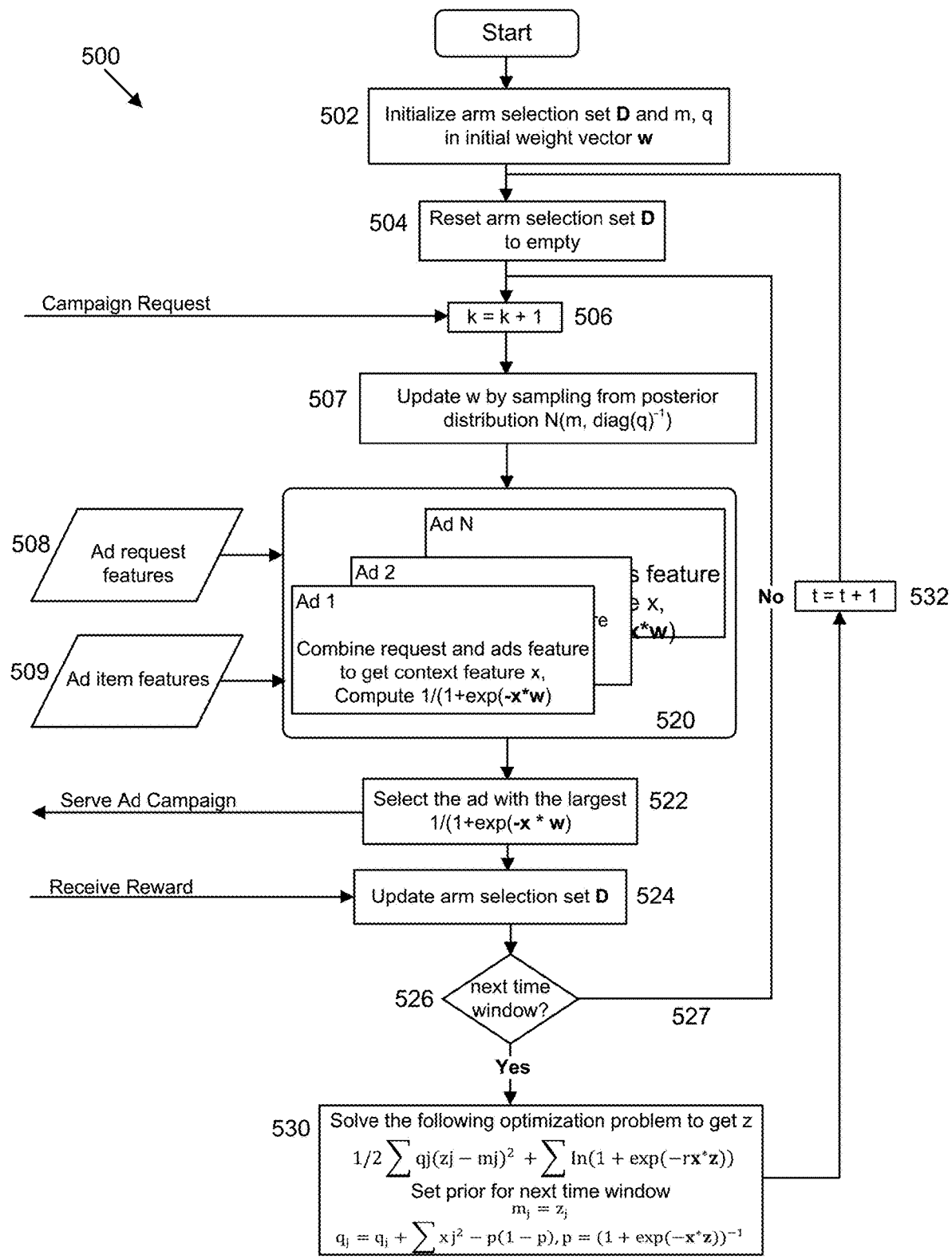
FIG. 5 is a flow diagram for selecting marketing ads in accordance with embodiments of the disclosed subject matter.

FIG. 5 illustrates an exemplary process 500 for selecting ads for presentation to the consumer carried out in marketing ad selection computing device 102. At the start, the variables are initialized as shown in Block 502, this may include batch size (a time window, a day, or a certain number of requests, etc.), arm selection set (feature set) D, parameters m and q (elements of the initial weight vector w), and the request count k is set to 0. As shown in Block 504, the arm selection set may be initialized to an empty set. The arm selection set at the beginning of each time window may be initialized with historical data and parameter projections in some embodiments.

Upon receipt of an campaign request, the request count k is incremented in Block 506, and in Block 507 the weight vector w is updated by sampling from the posterior distribution $N(m, \text{diag}(q)^{-1})$.

The ad request feature 508 and ad item features 509 are combined to get a context feature x used to calculate a feature set parameter a in Block 520, for example $a=1/1(1+\exp(-x*w))$. For each campaign request, ads are chosen (campaigns with best ad combination) with the best selected metric a based on a computation with all ad and item feature values and parameters. In Block 522, the ad campaign with the largest feature set parameter a are selected and provided (served) to the consumer/customer. Based upon the interaction of the consumer with the selected ads (ad campaign), an indication (reward r) is received in Block 524 which updates the arm selection set/feature set D with the reward r, for example: $D=D\cup\{x, a, r\}$. After each time window, the parameters values are recomputed based on collected data within the time window with the selected optimization method. For example, as shown in Block 526, when the request count k reaches the batch size/time window, an optimization algorithm is performed, otherwise following path 527, the process returns to Block 506.

At the end of the time window, the optimization algorithm us used to solve the optimization problem to get z. For example to get z the following may be minimized:

$$\tfrac{1}{2}\Sigma q_j(z_j-m_j)^2+\Sigma \ln(1+\exp(-r x^* z))$$

and the parameters of the weight vector w, m and q are updated:

$$m_j=z_j$$

$$q_j=q_j+\int x_j^2 * p(1-p), \text{ where } p=(1+\exp(-x^*z))^{-1}$$

The time window t is incremented for the next batch/time window in Block 532.

Simulations using the contextual bandit ad selection approach of the disclosed subject matter illustrate the advantages of the method above both a random selection approach as well as with Thompson sampling.

Figure 6:
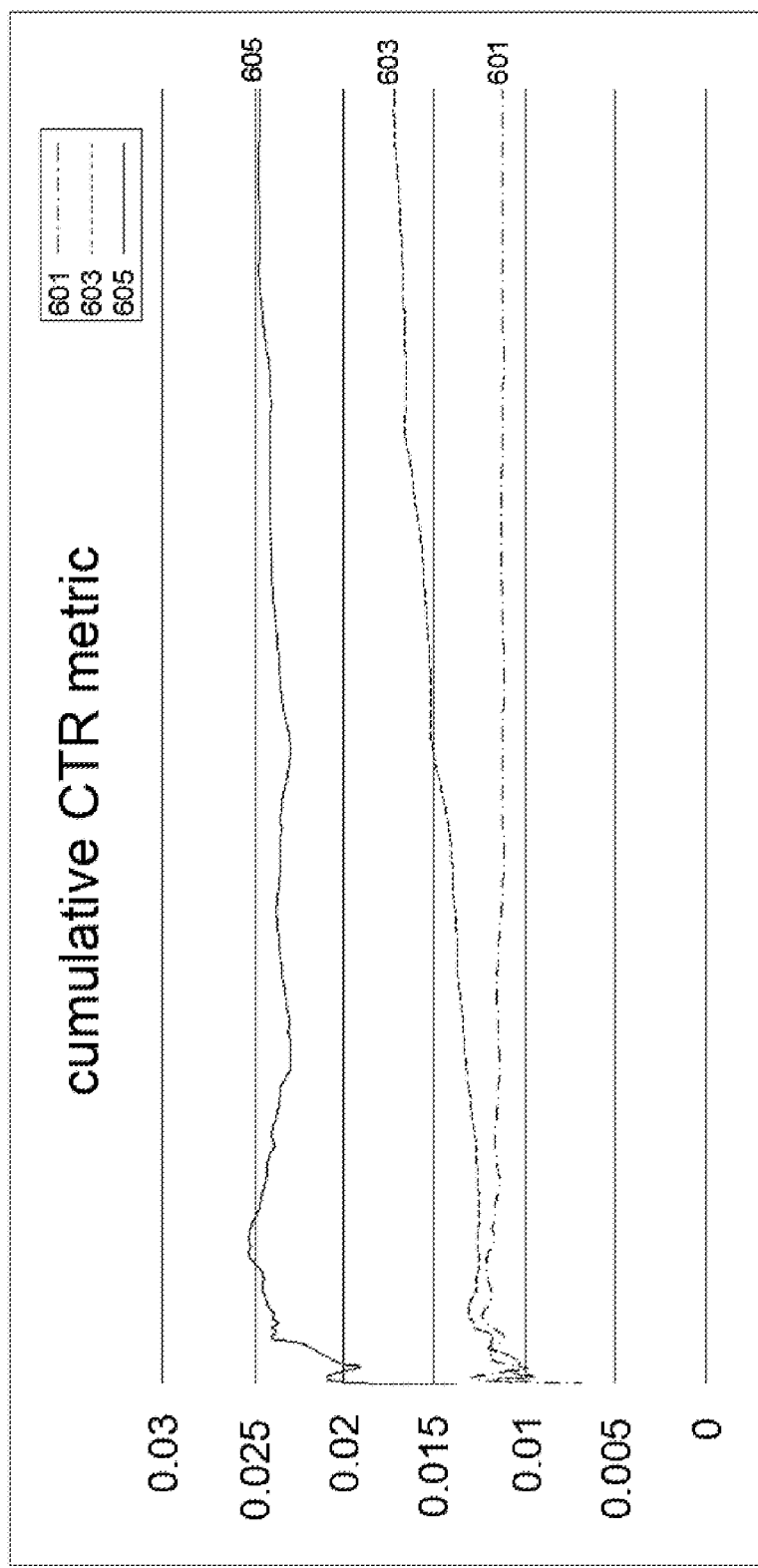
FIG. 6 are simulation results illustrating comparisons of CTR metrics for the disclosed subject matter and other models.

FIG. 6 is a chart showing the cumulative CTR metric for ad selection based on a random selection 601, a Thompson sampling selection 603 and a contextual bandit selection 605 of the disclosed subject matter. As shown the contextual bandit ad selection methodology of the disclosed subject matter results in a more favorable CTR metric is achieved and achieved quicker than the random 601 and Thompson 603 models. The CTR performance of the ads selected with Contextual Thompson Sampling model 605 exceeded the CTR achieved with the Thompson Sampling model 603.

Figure 7:
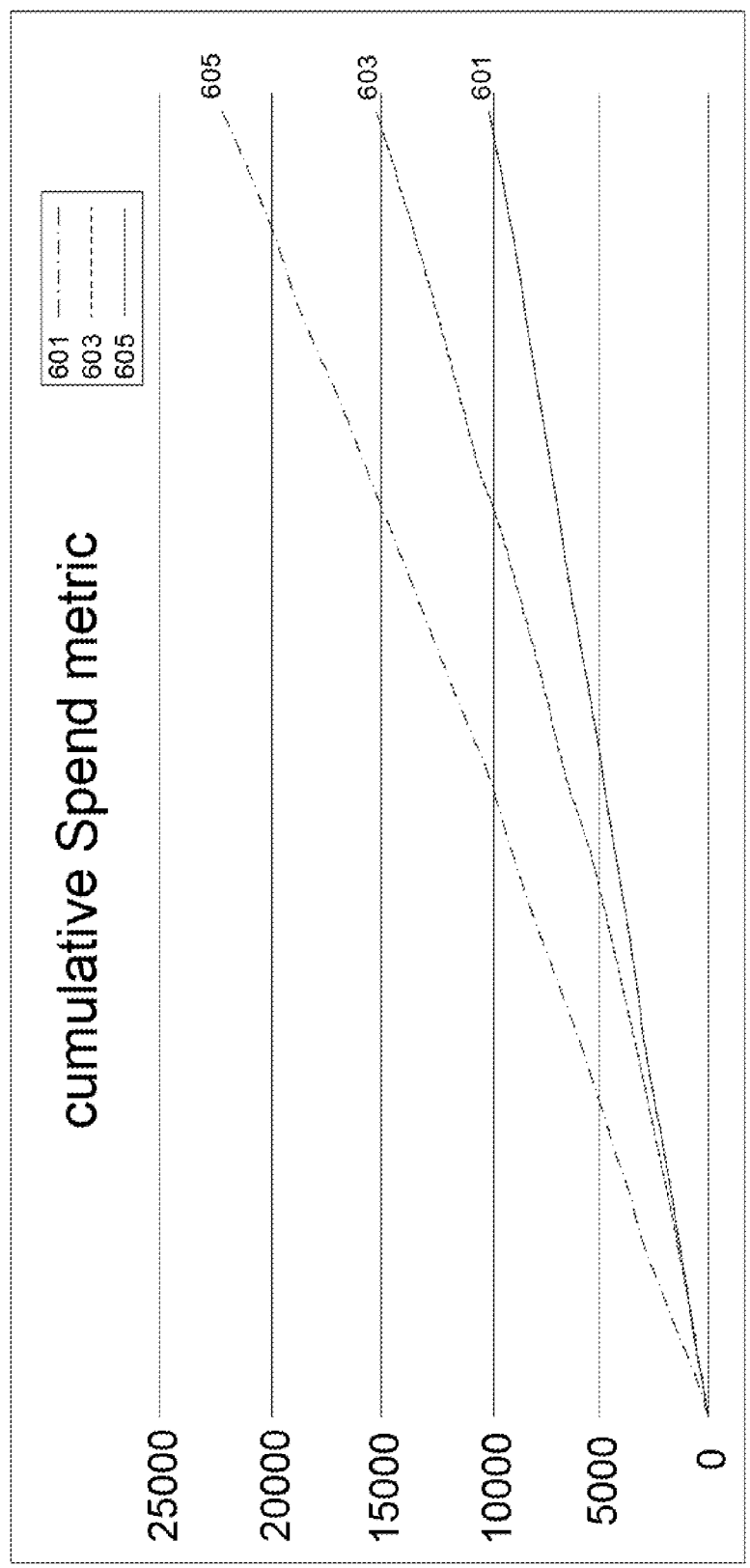
FIG. 7 are simulation results illustrating comparisons of spend metrics for the disclosed subject matter and other models.

FIG. 7 is a chart showing the cumulative spend metric for ad selection based on a random selection 601, a Thompson sampling selection 603 and a contextual bandit selection 605 of the disclosed subject matter. As shown the contextual bandit ad selection methodology of the disclosed subject matter results in a higher spend metric than the random 601 and Thompson 603 approaches.

Figure 8:
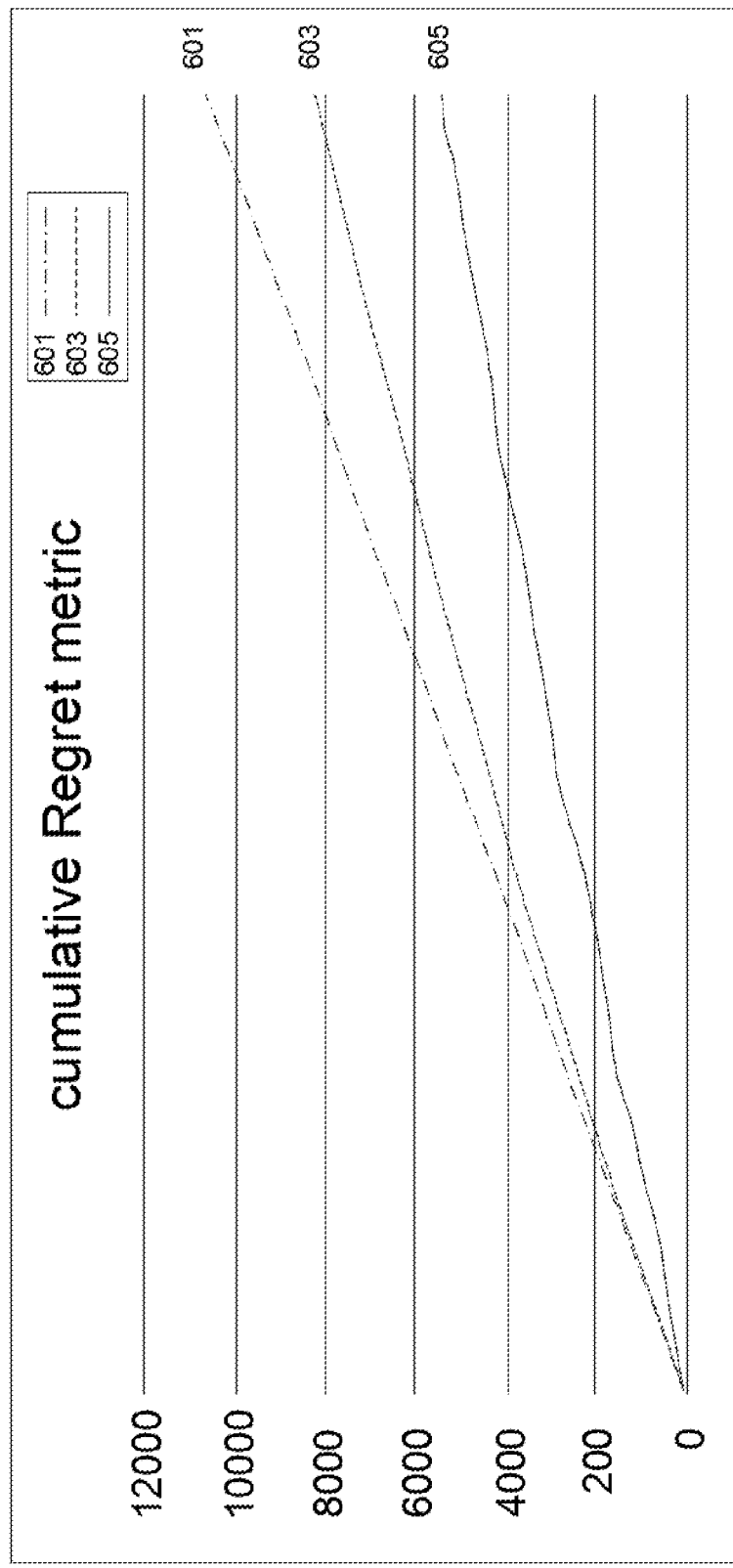
FIG. 8 are simulation results illustrating comparisons of regret metrics for the disclosed subject matter and other models; and, FIG. 9 is a flow diagram of a method for selecting ads in accordance with embodiments of the disclosed subject matter.

FIG. 8 is a chart showing the cumulative regret metric for ad selection based on a random selection 601, a Thompson sampling selection 603 and a contextual bandit selection 605 of the disclosed subject matter. As shown the contextual bandit ad selection methodology of the disclosed subject matter results in a lower (advantageous) regret metric than the random 601 and Thompson 603 approaches. Regret measures the difference between chosen ads and the best benchmark ads, the ads selected with Contextual Thompson Sampling model 605 achieves the lowest regret compared to Thompson Sampling model 603.

Figure 9:
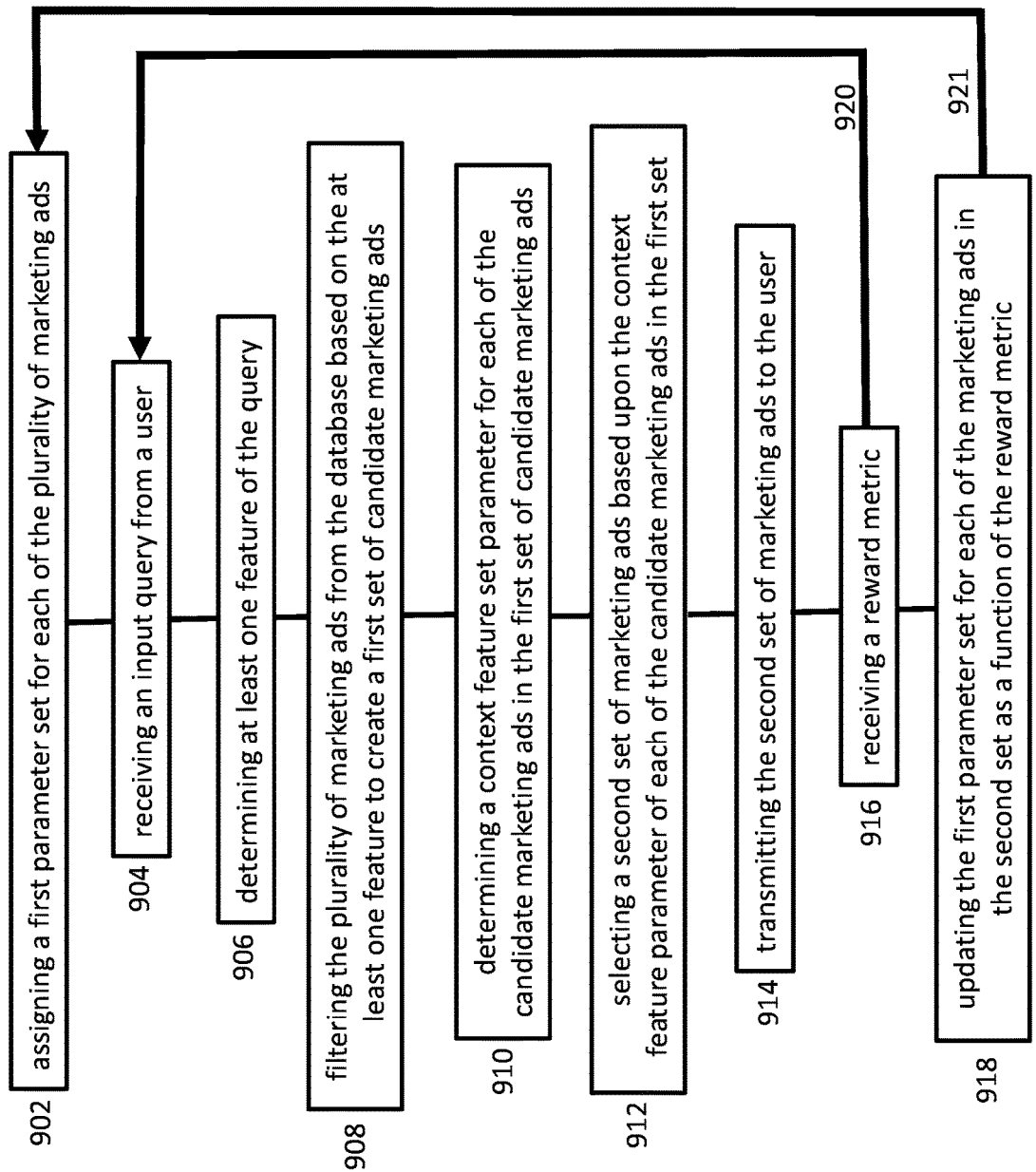

A method of selecting ads is shown in FIG. 9. A first parameter set is assigned for each of a plurality of marketing ads as shown in Block 902. A input query from a user is received in the computing device 102 as shown in Block 904. As part of the determining the query intent in order to response to the user query, a feature of the query is determined as shown in Block 906. Using the feature, such as a product or product type, the plurality of marketing ads are filtered based on the query feature and/or ad features to create a set of candidate marketing ads as shown in Block 908. In Block 910, a context feature set parameter for each of the candidate marketing ads in the first set of candidate marketing ads is determined and a second set is selected based on the highest context feature parameter of the candidate marketing ads as shown in Block 912. The second set of marketing ads are transmitted to the user for display as shown in Block 914. As a result of the user action, e.g. a click, or purchase etc. an associated reward metric is received and stored as shown in Block 916 and the first parameter set is optimized and updated with respect to the a plurality of stored reward metrics as shown in Block 918, and the process return to Block 904 to await a user query and associated ad request as shown in loop 920. As described above, the first parameter set may be updated upon expiration of a time window, or batch size as shown in loop 921 and the parameters may be further subjected to a weighted smoothing function to prevent instability and variance explosion problems. Several optimization algorithms are envisioned including "Nelder-Mead", "Powell", "L-BFG1-B" and "SLSQP" each of these algorithms has slightly different requirements in terms of parameter settings (tolerance thresholds, initial inputs, maximum number of iterations, function evaluations, etc.) Different payoff methods, like linear payoff and Logistic payoff may be considered to get the best optimization according to business need.

An additional aspect of the discloses subject matter, the automated shopping assistant may also detect the intent of the query, query a database for products and service satisfying the user query, and upon receiving the results transmits the query results to the user along with marketing ads. As noted above, the automated shopping assistant provide the avenue to present the selected ads and thus its user expected operations would advantageously continue.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two.

The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for retrieving marketing ads implementing a contextual bandit in response to a user query comprising:
   a communication system;
   a database containing a plurality of marketing ads;
   a consumer device; and
   a computing device operably connected to the database, the consumer device, and the communication system, the computing device, using a deep learning model, configured to:
      assign a first parameter set for each of the plurality of marketing ads;
      receive an input query from a user of the consumer device;
      determine at least one feature of the query;
      filter the plurality of marketing ads from the database based on the at least one feature of the query to create a first set of candidate marketing ads;
      determine a context feature set parameter for each of the candidate marketing ads in the first set of candidate marketing ads, wherein the context feature set parameter is based on at least one feature of the first set of candidate marketing ads and is a function of at least the first parameter set;
      select a second set of marketing ads based upon the context feature set parameter of each of the candidate marketing ads in the first set;
      transmit the second set of marketing ads to the consumer device of the user;
      receive a reward metric based on user interaction with the second set of marketing ads; and
      update and optimize the first parameter set for each of the marketing ads in the second set as a function of the reward metric.

2. The system of claim 1, wherein the computing device is further configured to:
   detect a query intent of the input query;
   query the database based upon the query intent;
   receive the query results from the database; and
   transmit the query results to the consumer device of the user along with second set of marketing ads in response to the input query.

3. The system of claim 1, wherein the computing device is further configured to:
   receive a second input query from the user of the consumer device;
   determine at least one second feature of the second query;
   filter the plurality of marketing ads from the database based on the at least one second feature of the second query and an updated first parameter set to create a third set of candidate marketing ads;
   determine an updated context feature set parameter for each of the candidate marketing ads in the third set of candidate marketing ads, wherein the updated context feature set parameter is based on at least one feature of the third set of candidate marketing ads and is a function of at least the updated first parameter set;
   select a fourth set of marketing ads based upon the updated context feature set parameter of each of the candidate marketing ads in the third set;
   transmit the fourth set of marketing ads to the consumer device of the user;
   receive a second reward metric based on user interaction with the fourth set of marketing ads; and
   update and optimize the updated first parameter set for each of the marketing ads in the fourth set as a function of the reward.

4. The system of claim 1, wherein the at least one feature of the first set of candidate marketing ads is selected from the group consisting of taxonomy, title, taxonomy vector; product vector; and price sensitivity.

5. The system of claim 1, wherein the reward metric is selected from the group consisting of views, clicks, add to cart and purchase.

6. The system of claim 1, wherein the first parameter set are elements of a weight vector and wherein the context feature set parameter is a function of the weight vector.

7. The system of claim 1, wherein the plurality of marketing ads each include at least one ad feature and the computing device is configured to filter the plurality of marketing ads based upon the at least one ad feature to create the first set of candidate marketing ads.

8. The system of claim 1, wherein the computing device is further configured to apply a smoothing function to an updated first parameter set.

9. The system of claim 6, wherein the computing device is further configured to create the weight vector as a function of a posterior distribution.

10. A method for improving a selection of marketing ads implementing a contextual bandit in response to a user query and using a deep learning model, comprising:
   assigning a first parameter set for each of a plurality of marketing ads;
   receiving an input query from a user of a consumer device;
   determining at least one feature of the query;
   filtering the plurality of marketing ads from a database based on the at least one feature of the query to create a first set of candidate marketing ads;
   determining a context feature set parameter for each of the candidate marketing ads in the first set of candidate marketing ads, wherein the context feature set parameter is based on at least one feature of the first set of candidate marketing ads and is a function of at least the first parameter set;
   selecting a second set of marketing ads based upon the context feature set parameter of each of the candidate marketing ads in the first set;
   transmitting the second set of marketing ads to the consumer device of the user;
   receiving a reward metric based on user interaction with the second set of marketing ads; and updating and optimizing the first parameter set for each of the marketing ads in the second set as a function of the reward metric.

11. The method of claim 10, further comprising:
detecting a query intent of the input query;
querying the database based upon the query intent;
receiving the query results from the database; and
transmitting the query results to the consumer device of the user along with second set of marketing ads in response to the input query.

12. The method of claim 10, further comprising:
receiving a second input query from the user of the consumer device;
determining at least one second feature of the second query;
filtering the plurality of marketing ads from the database based on the at least one second feature of the second query and an updated first parameter set to create a third set of candidate marketing ads;
determining an updated context feature set parameter for each of the candidate marketing ads in the third set of candidate marketing ads, wherein the updated context feature set parameter is based on at least one feature of the third set of candidate marketing ads and is a function of at least the updated first parameter set;
selecting a fourth set of marketing ads based upon the updated context feature set parameter of each of the candidate marketing ads in the third set;
transmitting the fourth set of marketing ads to the consumer device of the user;
receiving a second reward metric based on user interaction with the fourth set of marketing ads; and
updating and optimizing the updated first parameter set for each of the marketing ads in the fourth set as a function of the reward.

13. The method of claim 10, wherein the at least one feature of the first set of candidate marketing ads is selected from the group consisting of taxonomy, title, taxonomy vector; product vector; and price sensitivity.

14. The method of claim 10, wherein the reward metric is selected from the group consisting of views, clicks, add to cart and purchase.

15. The method of claim 10, wherein the first parameter set are elements of a weight vector and wherein the context feature set parameter is a function of the weight vector.

16. The method of claim 10, wherein the plurality of marketing ads each include at least one ad feature and the computing device is configured to filter the plurality of marketing ads based upon the at least one ad feature to create the first set of candidate marketing ads.

17. The method of claim 10, further comprising the step of applying a smoothing function to an updated first parameter set.

18. A non-transitory computer readable medium having instructions stored thereon, wherein the instructions, when executed by at least one processor of a device for retrieving marketing ads implementing a contextual bandit in response to a user query and using a deep learning model, cause the device to perform operations comprising:
assigning a first parameter set for each of a plurality of marketing ads;
receiving an input query from a user of a consumer device;
determining at least one feature of the query;
filtering the plurality of marketing ads from a database based on the at least one feature of the query to create a first set of candidate marketing ads;
determining a context feature set parameter for each of the candidate marketing ads in the first set of candidate marketing ads, wherein the context feature set parameter is based on at least one feature of the first set of candidate marketing ads and is a function of at least the first parameter set;
selecting a second set of marketing ads based upon the context feature set parameter of each of the candidate marketing ads in the first set;
transmitting the second set of marketing ads to the consumer device of the user;
receiving a reward metric based on user interaction with the second set of marketing ads; and
updating and optimizing the first parameter set for each of the marketing ads in the second set as a function of the reward metric.

19. The non-transitory computer readable medium of claim 18, wherein the instructions further perform the operations of:
detecting a query intent of the input query;
querying the database based upon the query intent;
receiving the query results from the database; and
transmitting the query results to the consumer device of the user along with second set of marketing ads in response to the input query.

20. The non-transitory computer readable medium of claim 18, wherein the instructions further perform the operations of:
receiving a second input query from the user of the consumer device;
determining at least one second feature of the second query;
filtering the plurality of marketing ads from the database based on the at least one second feature of the second query and an updated first parameter set to create a third set of candidate marketing ads;
determining an updated context feature set parameter for each of the candidate marketing ads in the third set of candidate marketing ads, wherein the updated context feature set parameter is based on at least one feature of the third set of candidate marketing ads and is a function of at least the updated first parameter set;
selecting a fourth set of marketing ads based upon the updated context feature set parameter of each of the candidate marketing ads in the third set;
transmitting the fourth set of marketing ads to the consumer device of the user;
receiving a second reward metric based on user interaction with the fourth set of marketing ads; and
updating and optimizing the updated first parameter set for each of the marketing ads in the fourth set as a function of the reward.

* * * * *